J. KRIPINGER.
LUBRICATOR.
APPLICATION FILED OCT. 14, 1911.
1,023,662.
Patented Apr. 16, 1912.
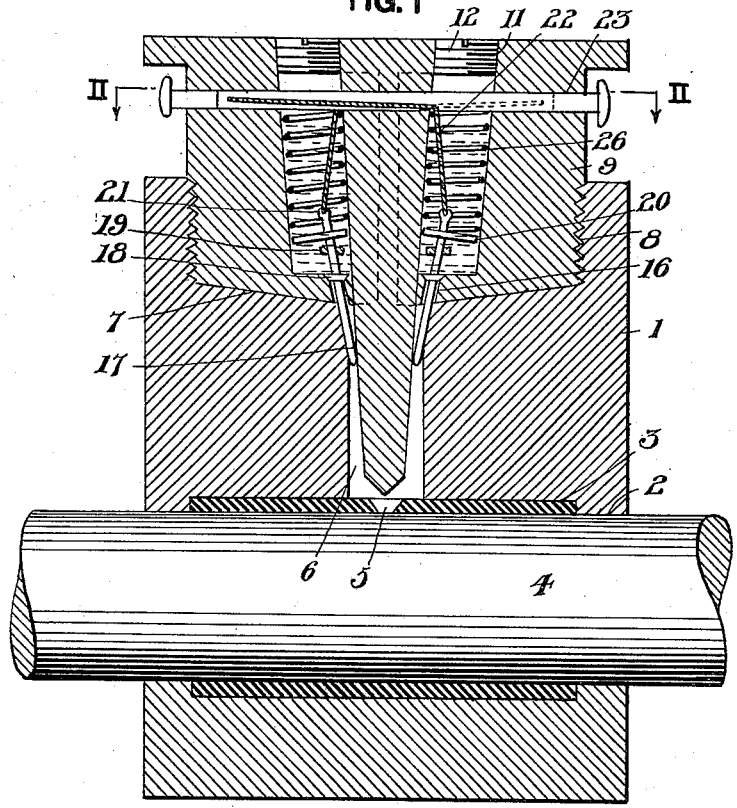
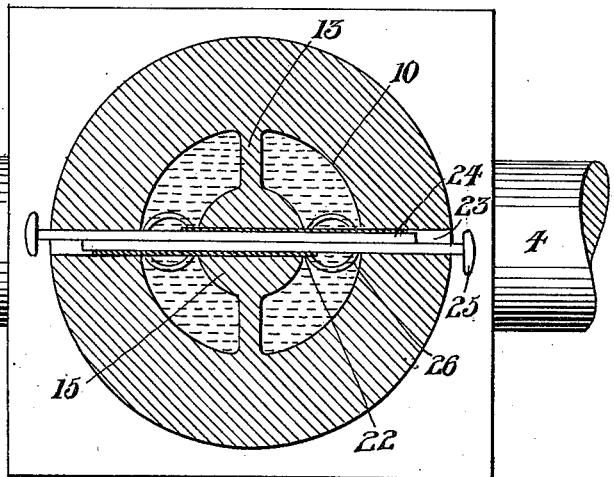
WITNESSES
INVENTOR
J. Kripinger
BY
ATTORNEYS

UNITED STATES PATENT OFFICE.

JOSEPH KRIPINGER, OF BRAINARDS, NEW JERSEY.

LUBRICATOR.

1,023,662.

Specification of Letters Patent.

Patented Apr. 16, 1912.

Application filed October 14, 1911. Serial No. 654,704.

*To all whom it may concern:*

Be it known that I, JOSEPH KRIPINGER, a subject of the King of Hungary, residing at Brainards, in the county of Warren and State of New Jersey, have invented certain new and useful Improvements in Lubricators, of which the following is a specification, reference being had therein to the accompanying drawing.

This invention relates to lubricators, and the primary object of my invention is the provision of novel means for feeding a lubricant to a bearing from a reservoir located above said bearing.

Another object of this invention is to provide a lubricant cup with valves that are normally closed and are adapted to be manually opened to release a lubricant from the cup, thus preventing the lubricant from being wasted upon a bearing.

With the above and other objects in view, the invention resides in the novel construction, combination and arrangement of parts to be hereinafter specifically described and then claimed.

Reference will now be had to the drawing, wherein:—

Figure 1 is a longitudinal sectional view of the lubricator, and Fig. 2 is a horizontal sectional view taken on the line II—II of Fig. 1.

The reference numeral 1 denotes a bearing having a bore 2 provided with a bushing 3 and revolubly mounted in said bushing is a shaft 4. This shaft may represent an axle, spindle, wrist pin or other structure to be lubricated. The bushing 3 has a central tapering opening 5 in communication with a vertical port 6 formed in the bearing 1, said port having the upper wall thereof flared and in communication with a socket 7 formed in the upper end of the bearing 1. The socket 7 has the vertical walls thereof screw threaded, as at 8 to receive the lower exteriorly screw threaded end of a cup or plug 9. The cup or plug 9 has two segment-shaped recesses 10 having the upper ends thereof terminating in proximity to the upper end of the cup or plug 9, said recess being in communication with openings 11 that are normally closed by exteriorly screw threaded plugs or screws 12, the openings 11 permitting of a lubricant being placed within the recess 10. The formation of the recess 10 provides webs 13 supporting a central depending pin 15 that extends into the port 6 in proximity to the opening 5 of the bushing 3, said pin serving functionally as a drip needle for a lubricant contained within the recess 10.

The lower ends of the recesses 10 are in communication with the port 6 by angularly disposed valve ports 16 and movably mounted in said valve ports are valve stems 17 that extend into the port 6 at diametrically opposed sides of the pin 15. The valve stems 17 are provided with valves 18 adapted to normally close the ports 16 and said valve stems are guided by transverse bars 19 carried by the walls of the recesses 10. The upper ends of the valve stems 17 are provided with circular heads 20 and eyes 21. The eyes 21 are connected to cables 22 that extend upwardly into the recesses 10 into a transverse opening 23 provided therefor in the cup or plug 9. The cables 22 extend in opposite directions and are connected to plungers 24 movably mounted in the opening 23, said plungers protruding from the outer ends of the opening and having heads 25, whereby said plungers can be pressed together to elevate the cables 22 and the valve stems 17 attached thereto. The opening 23 extends transversely of the cup or plug 9 below the openings 11, and the plungers 24 snugly fit within the opening 23, whereby a lubricant cannot seep between said plungers and the walls of said opening. Interposed between the heads 20 and the plungers 24 are coiled compression springs 26, said springs normally retaining the valves 18 closed and the plungers in a retracted position. When the plungers are pushed inwardly, the tension of the springs 26 is increased, and the valves 18 are raised allowing the lubricant within the recesses 10 to flow into the ports 6, said lubricant flowing upon the lower ends of the valve stems and the pin 15. Immediately upon the plungers being released, the tension of the springs 26 closes the valves 18 and restores the plungers to an extended position ready to again be pushed inwardly to elevate the valves 18.

The lubricator in its entirety can be made of light and durable metal and used in connection with various kinds of bearings.

What I claim is:—

1. In a lubricator, a bearing, a plug detachably mounted in said bearing and having recesses formed therein adapted to contain a lubricant, a depending pin carried by said plug and extending into said bearing, said plug having ports formed therein establishing communication between said recesses and said bearing, spring pressed valves normally closing said ports, said plug having a transverse opening formed therein, and plungers arranged in said opening and having connection with said valves whereby when said plungers are pressed inwardly said valves will be elevated.

2. In a lubricator, a bearing having an opening formed therein, a plug detachably mounted in said bearing, said plug having lubricant recesses formed therein in communication with the opening of said bearing, valves arranged in said recesses for controlling the admission of lubricant to the opening of said bearing, and plungers arranged transversely of said plug and having connections with said valves whereby said valves can be opened.

3. In a lubricator, the combination with a bearing having an opening formed therein, of a plug detachably mounted in said bearing and having a depending pin extending into the opening thereof, said plug having lubricant recesses formed therein in communication with the opening of said bearing, spring pressed valves arranged in said recesses for controlling the supply of lubricant to the opening of said bearing, detachable plugs closing the upper ends of said recesses, and plungers arranged transversely of said plug and having connection with said valves whereby when said plungers are pushed inwardly said valves will be elevated to admit lubricant to the opening of the said bearing.

In testimony whereof I affix my signature in the presence of two witnesses.

JOSEPH KRIPINGER.

Witnesses:
MIKE KELEMEN,
JAMES DORCSIC.

---

Copies of this patent may be obtained for five cents each, by addressing the "Commissioner of Patents, Washington, D. C."